MULTIPHASE GATE USABLE IN MULTIPLE PHASE GATING SYSTEMS

Filed Jan. 28, 1966 4 Sheets-Sheet 1

INVENTOR.
ROBERT K. BOOHER
BY
Robert G. Rogers
ATTORNEY

INVENTOR.
ROBERT K. BOOHER
BY Robert G Rogers
ATTORNEY

INVENTOR.
ROBERT K. BOOHER
BY Robert G. Rogers
ATTORNEY

Sept. 1, 1970 R. K. BOOHER 3,526,783

MULTIPHASE GATE USABLE IN MULTIPLE PHASE GATING SYSTEMS

Filed Jan. 28, 1966 4 Sheets-Sheet 4

INVENTOR.
ROBERT K. BOOHER

BY Robert G Rogers

ATTORNEY

United States Patent Office 3,526,783

Patented Sept. 1, 1970

3,526,783
MULTIPHASE GATE USABLE IN MULTIPLE PHASE GATING SYSTEMS

Robert K. Booher, Downey, Calif., assignor to North American Rockwell Corporation, a corporation of Delaware Filed Jan. 28, 1966, Ser. No. 523,767
Int. Cl. H03k 19/02
U.S. Cl. 307—205 20 Claims

ABSTRACT OF THE DISCLOSURE

An effective or discrete output capacitor is unconditionally charged during a phase one time, and is conditionally discharged during a phase two time as a function of the logic state of at least one logic device. In addition, during phase one, the voltage used in charging the output capacitor is also used to charge the inherent capacitances of the logic devices which are connected in series with the charge voltage.

This invention relates to an improved multiple phase gating system and more particularly to such a system using electronic gating devices connected in circuits with discrete or effective capacitances which may be charged and discharged.

The insulated gate field effect transistors or metal oxide semiconductor transistors, as they are often designated, as well as recently developing devices, are well suited for the mechanization of complex logic functions on a single substrate or die. The field effect transistors have an advantage over the other semiconductor devices for such uses due to their extremely small size, lower power requirement and because of the simple process for producing large quantities in a relatively short time.

However, such devices, particularly the field effect transistors, have an inherent dynamic resistance that places certain limitations on their use, for example, in gating systems. Their resistance must be carefully considered in designing a system. Often, the resistance restricts the use of many logical configurations and may result in slow response time when they are used. In other circuit configurations, larger devices used to overcome the resistance limitation hamper circuit design and fabrication. In addition to slowing system response, the power dissipation is relatively high.

The present system utilizes a multiple phase gating system which overcomes the inherent limitations of such devices and permits the use of complex logic functions heretofore unusable. The problems incurred in the prior art are overcome by dividing the setting and resetting intervals of a gating system.

Briefly, the multiple phase gating system of the invention comprises a first gating means for setting the output (e.g., charging the capacitance) and inherent capacitance of a two terminal logic network during a first recurring interval, or first phase recurring clock signal. Choosing a convention, for explanation, the first interval may be stated to be determined by the true level of the first phase of the multiple phase gating system. By way of example, the gate electrode of the first gating means is connected to a phase of a multiphase gating source, or clock signal, so that the gating means allows conduction to output means (such as the capacitance mentioned above) during the first interval. Each time the true interval occurs, the output is unconditionally set true and the logic network is precharged to prevent charge splitting.

The system in a widely-useful embodiment may also include a logic configuration, or logic function, having one or more inputs thereto. The logic configuration may be comprised of various "and-or" combinations as well as other complex or simple logic functions. The logic configuration includes resetting means for conditionally resetting the output as a function of the inputs to the logic. The word "conditional" is used herein to distinguish the conditional resetting of the output from an unconditional resetting of the output. The logic function, of course, may isolate among its inputs the outputs from other stages. For example, if the logic configuration comprises a plurality of field effect transistors connected as an "and" function, when all the "and" inputs are true, the output means is reset from true to false. In other words, if the logical states of the inputs are true, the output is set to a false logic state. If any one of the inputs is not true then the output remains true. Thus, it is noted there is a logical inversion at this point. By providing means for setting the output during one interval and resetting during a second interval, the dynamic resistance problem of the prior art is overcome. In addition, by precharging the inherent capacitance of the logic network, division of charge (charge splitting) between the output capacitance and the capacitance of the network is avoided. In the preferred embodiment, the bottom terminal of the logic network is provided with a voltage level approximately equal to the output setting voltage level during the first phase recurring clock signal to prevent unnecessary power dissipation in the event an electric path exists through the function.

The second interval corresponds to a second phase recurring clock signal. The clock signals may also be referred to as gating or synchronizing signals. Devices having the same electrical characteristics, such as dynamic resistance, conductance, etc. can be used. Since the intervals are divided there is no necessity for having larger devices in the logic configuration in order to discharge the output capacitor and power is only used for charging and discharging the output capacitor. It is realized, of course, that the output means might be unconditionally set false each first recurring interval and then allowed to remain "false" or to be set "true" as a function of the logic without departing from the scope of this invention.

The gating system also includes isolation means for isolating the output from the logic during such intervals as the inputs thereto may be changing. The output should be stable when it is being used on an input to a subsequent stage. During the isolation period the output may be used as an input to other gates connected for forming more complex multiple phase systems which mechanize complex logical functions, such as registers, counters and adders.

Therefore, it is an object of this invention to provide an improved multiple phase gating system using electronic gating devices.

It is still another object of this invention to provide a gating system using means for isolating an output means from its input and its output during selected intervals of time.

A still further object of this invention is to use a multiphase signal for changing the logic of the output as a function of the inputs to a logical configuration.

It is another object of this invention to provide a multiple phase gating system using a multiple phase signal for unconditionally setting the output of said system during recurring intervals and for conditionally resetting the output during different intervals as a function of logic.

These and other objects of this invention will become apparent in connections with the following drawings of which:

Figure 1:
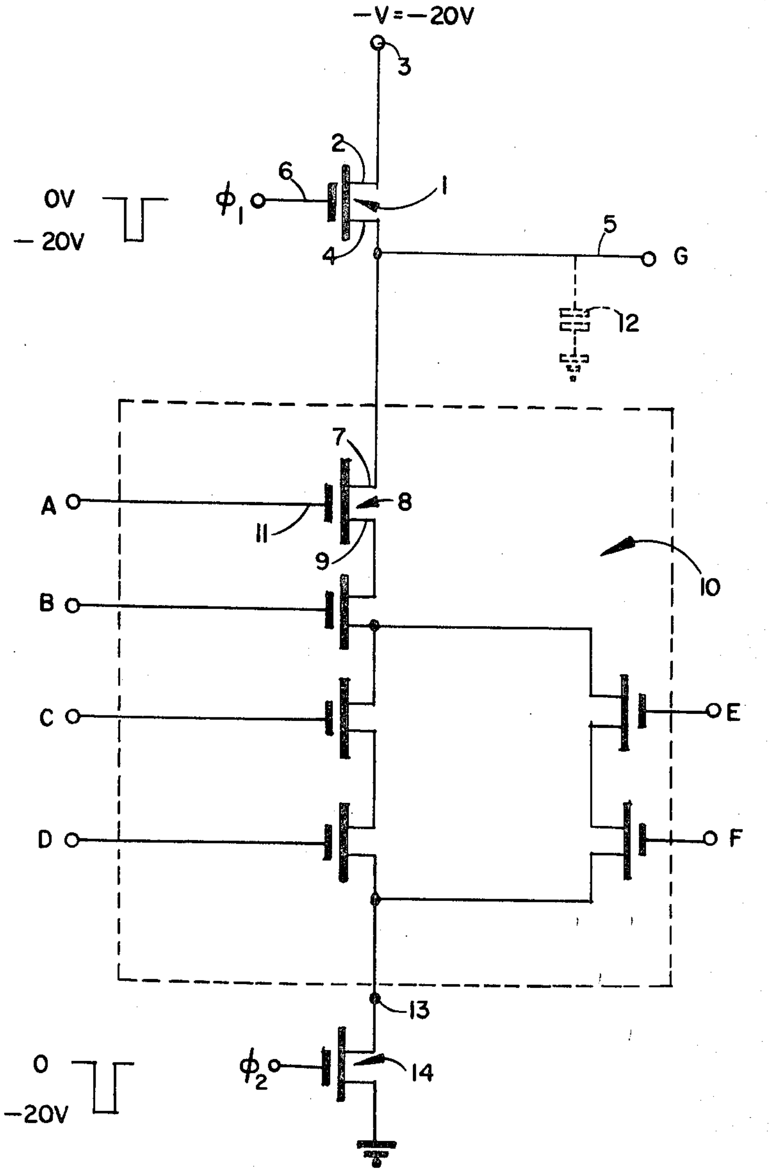
FIG. 1 is a representation of one embodiment of a two phase gating system.

Referring now to FIG. 1 there is shown a simple two phase gating system comprising a field effect transistor 1 having a drain electrode 2 connected to an energy source 3, such as source of fixed voltage, a source electrode 4 connected to an output 5, and a gate electrode 6 connected to receive a signal $\phi_1$, which is a recurring clock or gating signal having a true and a false interval. During the true interval of $\phi_1$, the source potential at 3 appears at output 5 and sets the output to that level. Although the level is shown as a constant −V or −20 volts, it could be a changing signal such as $\phi_1$. In other embodiments, $\phi_1$ may be connected to 3.

In the embodiment shown in FIG. 1, it is believed that the conductor connected to output 5 creates stray capacitance. In addition, the field effect devices have an amount of inter-electrode capacitance. All these capacitances are lumped together and shown as a discrete capacitor 12 connected from output 5 to ground. Capacitor stores the potential appearing at output 5 until it is reset. An actual (discrete) capacitor may, of course, be connected as capacitor 12.

The output means comprises output 5 and such capacitance. Output 5 is conneced to a drain electrode 7 of a field effect transistor 8. Source electrode 9 of transistor 8 of is connected to other field effect devices shown as comprising a field effect device having an input B in series with each of two series of devices, the first series of which having inputs C and D and the second series of which having inputs E and F. Field effect transistor 8 includes a gate electrode 11 which is shown as having an input A. The total combination of field effect devices having inputs A through F may be described as a logic function 10 having two terminals, 13 and 13'. The devices mechanize the logic equation $$G=\overline{AB(CD+EF)}$$

at output 5.

Logic function 10 has a reset input terminal 13 connected to the drain electrode of a field effect transistor 14, the source electrode of which is connected to ground and the gate electrode of which is connected to receive a signal $\phi_2$, which is a recurring clock or gating signal having a true and a false interval. It should be understood that clock $\phi_2$ must be true, −20 v. in order to gate the logic function.

In operation, when $\phi_1$ becomes true, transistor 1 conducts and capacitor 12 is charged toward −V potential. Subsequently, when $\phi_2$ becomes true, output 5 is subject to being reset to ground level through logic function 10 and transistor 14 having $\phi_2$ as input depending on the state of A–F inputs. For example, if either C and D or E and F are true and A and B are true, when clock $\phi_2$ is true, capacitor 12 is discharged or reset to ground. Stated alternately, the input signals A through F on the control electrodes of the field effect transistors comprising the logic function 10, determine the existence of an electrical path from the output terminal 5 to terminal 13 of the logic function. When capicator 12 is subject to being reset, $\phi_1$ is false and transistor 1 is cut-off or non-conductive, If C or D are false and E or F are false or A or B are false, then the output remains charged toward −V. It should be obvious, therefore, that the input signals A through F have two levels representing the true and false logic states. Since the output is reset conditionally, instead of unconditionally, as a function of the state of the input signals, it should also be obvious that the signal levels do not necessarily occur in successive order.

In some cases, it is necessary to isolate the output from the logic function and to pre-condition certain of the transistors comprising the logic function. If such a requirement is present, it may be desirable to convert transistor 8 into an isolation transistor with input A comprised of the logical "or" of clock signals $\phi_1$ and $\phi_2$. $\phi_1$ or $\phi_2$ may be mechanized by an "or" gate (not shown). In that case, $\phi_1$ would comprise one phase recurring clock signal and $\phi_2$ a second phase recurring clock signal. Obviously, the $\phi_{1+2}$ clock signal has a true period (phase) which is twice as large as the $\phi_1$ clock signal.

By using transistor 8 as an isolation transistor, output 5 is isolated from the remainder of the logic function when $\phi_1$ and $\phi_2$ are false. The output will not be subject to change during that period and can therefore be used as an input to a subsequent gate.

During the time $\phi_1$ is true, and transistor 1 conducts to charge capacitor 12, transistor 8 is also on and its effective capacitor (not shown) will also be charged toward −V. In addition, if any of the transistors were previously conducting, their effective capacitor could have been charged to ground and should be charged toward −V. Of course, the charge on any of the devices is only of concern if a leakage path to the output capacitor 12 could occur. Otherwise, the output level on capacitor 12 could be reduced and might prevent its effective use as an input potential to a subsequent stage.

Figures 2, 3:
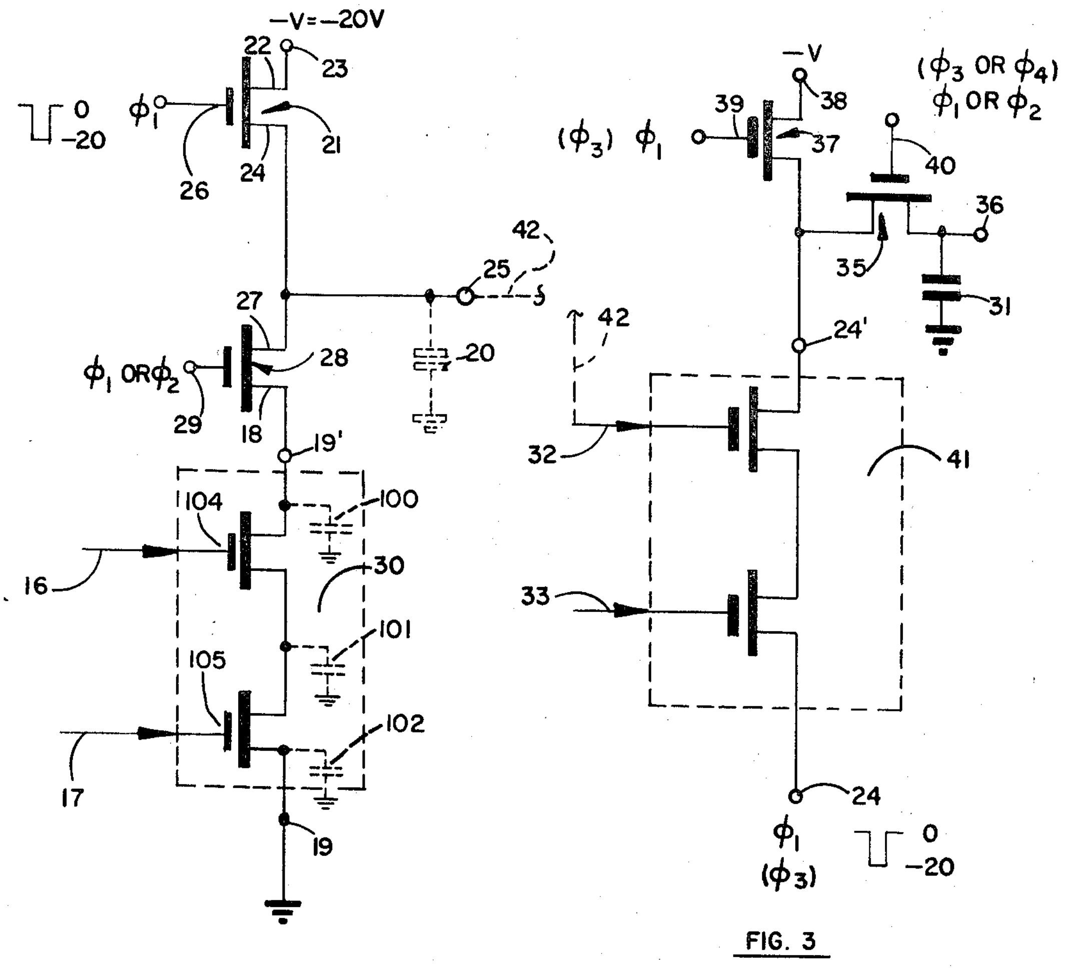
FIG. 2 is a representation of a second embodiment of a two phase gating system.
FIG. 3 is a representation of another embodiment of a two phase gating system.

A more specific example is shown in FIG. 2. During a first phase time ($\phi_1$—true) MOS device 21 turns on and a voltage, approximately −V, is supplied to output terminal 25 to charge the inherent stray capacitance represented by capacitor 20. At the same time, since the $\phi_{1+2}$ signal is also true, MOS device 28 is turned on so that the stray inherent capacitances associated with the electrodes of the MOS devices forming logic function 30 are also charged. That is, assuming that certain of the MOS devices are turned on, which could be the case.

FIG. 2 shows the inherent stray electrode capacitances of MOS devices 104 and 105 comprising logic function 30. If MOS device 104, for example, is turned on during $\phi_1$ time, the inherent stray capacitances 100 and 101 would be charged.

During $\phi_2$ time, which is a continuation of the $\phi_{1+2}$ time, MOS device 21 turns off and the logic function implemented by MOS devices 104 and 105 is evaluated. If only one of the devices, for example device 104, is turned on during $\phi_2$ time, then capacitor 20 would not discharge during $\phi_2$ time. However, it is pointed out that if the inherent stray capacitances 100 and 101 had not been charged (precharged) during $\phi_1$ time, that is, if device 28 did not have a true input on electrode 29 during $\phi_1$ time, then the charge on capacitor 20 would have been used to charge the stray capacitances 100 and 101 during $\phi_2$ time. If that had occurred, less voltage would have been available at output terminal 25 for providing a true voltage level to inputs such as input 32 of logic function 41 shown in FIG. 3. It is for that reason that it is important to always precharge the inherent stray capacitances of the MOS devices comprising a logic function.

Referring now to FIG. 2, there is shown a simple two phase gating system comprising a first gating device illustrated as a field effect transistor 21 having a drain electrode 22 connected to an energy source 23, such as a fixed voltage −V, a source electrode 24 connected to an output 25, and a gate electrode 26 connected to receive a signal $\phi_1$, which is a recurring clock or gating signal having a true and a false interval. In a particular embodiment, energy source 23 may be connected to signal $\phi_1$. During the true interval of $\phi_1$, the potential at 23 appears at the output and sets the output to the level of the potential at 23. The capacitances are lumped together and shown as a discrete capacitor 20 (shown in dotted lines) connected from output 25 to ground. Capacitor 20 stores the potential appearing at the output until it is reset. An actual (discrete) capacitor may, of course, be connected as is capacitance 20.

The output means comprises output 25 and such capacitance. Output 25 is connected to a drain electrode 27 of a field effect transistor 28. Source electrode 18 of transistor 28 is connected to a logic function 30 (terminals 19 and 19') which is shown as comprising a series of AND gates although the logic configuration could be any simple or complex logic mechanization. Field effect transistor 28 includes a gate electrode 29 which is connected to a signal comprising the logical "or" of $\phi_1$ or $\phi_2$. A logic gate (not shown), such as an OR gate, may be used to gate $\phi_1$ or $\phi_2$ to electrode 29 when either is true. For the embodiment shown, $\phi_2$ is true after $\phi_1$ is true for an interval.

The inputs to the gating system comprises inputs 16 and 17 although the specific number is not intended to be a limitation. There may be one or as many inputs as the logic mechanization requires.

Logic function 30 is shown as including an input terminal 19 connected to ground. However, the input terminal may be connected to a source of electrical energy such that at one interval, such as when $\phi_1$ is false, the energy level is electrical ground, or false. Input 19 is used to achieve reset of capacitor 20.

In operation, during the first interval when $\phi_1$ is true (−20 volts), output 25 is unconditionally set toward the level of −V (that is, capacitor 20 is charged toward −20 volts) without regard to the inputs to logic function 30. In addition, the inherent capacitance of the field effect transistors comprising logic function 30 is charged since field effect transistor 28 is turned on and −V is applied to terminal 19' during $\phi_1$. The term "logic function" may be used interchangeably with the term "logic network." As indicated above, when the bottom terminal 19 is clocked as with the $\phi_1$ signal, approximately the same voltage level is applied to both terminals of the logic function 30 during $\phi_1$ so that the logic is charged and unnecessary power dissipation is prevented in those instances where an electronic path exists between the terminals. In order for the logic function to provide a discharge path for the output capacitance during the non-overlapping portion of the $\phi_{1+2}$ clock signal, for example the $\phi_2$ true interval, the bottom terminal 19 is connected to a new or different voltage level. In one embodiment where the bottom terminal is not connected to a clock signal, it may always be connected to ground. In such instances, a ground potential provides the different voltage level. It is clear that the ground connection exists at least during the second recurring clock signal, $\phi_2$, although it may exist at other times. In other embodiments, other means may be provided to insure a change in voltage levels during the two phase recurring clock signals. Subsequently, $\phi_1$ becomes false and cuts transistor 21 off. $\phi_2$ is true when $\phi_1$ is false and depending on the inputs to logic function 30, output capacitor 20 is unchanged (allowed to remain "true") or if the logic permits, it is charged to the ground level (which indicates "false") appearing at point 19. Capacitor 20 is thereby conditionally reset false as a function of the true condition of the inputs to logic function 30. Thus, it is noted (as previously mentioned) the system has a logical inversion at this point. The capacitor 20 is discharged to false if the logic function inputs as shown are true and the capacitor remains charged to true if the inputs are false. Stated alternately, the field effect transistors 104 and 105 implement the logic function 30 which has a logic state (true or false) determined by the levels of the input signals 16 and 17. Each of the input signals have at least two signal levels which do not necessarily occur in successive order. It is pointed out that the clock signals $\phi_1$ and $\phi_2$ occur unconditionally during each operating cycle. The input signals 16 and 17 have true or false levels which occur independently of the clock signals.

If the input signal levels are true (negative for the embodiment shown), during $\phi_2$ time, the output 25 is connected to terminal 19. By monitoring the output 25, it can therefore be determined that the inputs to the MOS devices comprising the logic function were true during $\phi_2$ time.

For the AND gate embodiment shown in FIG. 2, in order to gate the resetting signal or level to output 25, the inputs (16, 17) must all have been true when $\phi_2$ was true. At other intervals, except when $\phi_1$ and $\phi_2$ are true, the signal appearing at gate electrode 29 is false and transistor 28 is cutoff, thereby isolating output 25 from inputs 16 and 17. The isolation is important since the inputs to the logic function may be changing. If output 25 is being used as an input to a subsequent stage and there is no isolation, the output value may change and interfere with gating of the subsequent stage.

The FIG. 3 embodiment is substantially the same as the FIG. 2 embodiment except that an isolation transistor 35 is connected between the output 36 the source electrode of transistor 37. Logic function 41 is connected to the source electrode of transistor 37 and to one electrode of transistor 35. Transistor 35 is used in a bi-directional manner. The other electrode of transistor 35 is connected to the output. The resetting input is shown as point 34 connected to $\phi_1$ instead of ground as shown in FIG. 2.

The system operates substantially the same as the FIG. 2 embodiment. The output is set by charging the effective capacitor 31 true during a first interval. In addition, the logic function 41 is connected to −V so that its inherent capacitance is also charged during the $\phi_1$ clock signal. During a second clock signal $\phi_2$, or interval, depending on the logic function 41, the signal appearing at point 34, which is ground during this interval, is gated to the output to reset the capacitor. During other intervals, the output is isolated from the logic function inputs.

In the event a simple shift register stage is desired and if $\phi_1$ and $\phi_2$ of the FIG. 3 embodiment are changed to $\phi_3$ and $\phi_4$, respectively, output 25 of the FIG. 2 gate may be connected as input 32 of the FIG. 3 gate. $\phi_3$ becomes true after $\phi_2$ and $\phi_4$ is true after $\phi_3$ is true and before $\phi_1$ is true. $\phi_3$ and $\phi_4$ are shown in parenthesis for convenience. Output 25 is isolated from logic 30 during $\phi_3$ and $\phi_4$ are true. $\phi_3$ and $\phi_4$ may be uesd satisfactorily as an input to logic 41. If output 25 is true when $\phi_4$ and input 33 are true, the signal level appearing at 34 is gated to the output 36 to charge the capacitor to that level. Since $\phi_3$ (substituted for $\phi_1$) is used, it would be ground or 0 volts during $\phi_4$ true time and capacitor 31 would be charged to 0 volts.

It should be appreciated that in a preferred embodiment, the stages of a shift register have their isolation transistors connected identically in the circuit and not differently, as shown in FIGS. 2 and 3.

Figure 4:
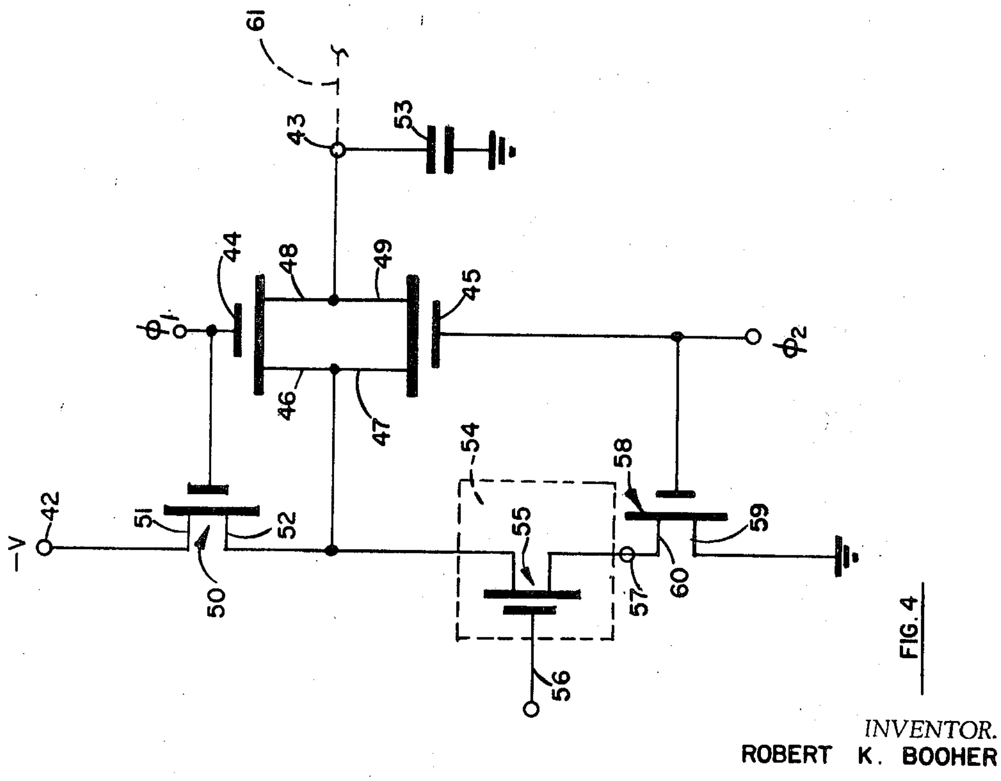
FIG. 4 is a representation of an embodiment of a two phase gating system.

Referring now to FIG. 4, wherein is shown field effect transistor 50 having drain electrode 51 connected to energy source 42 and source electrode 52 connected to parallel connected field effect transistors 44 and 45. For the embodiment shown, their electrodes 46 and 47 are interconnected as well as their electrodes 48 and 49. Electrodes 48 and 49 are connected to output 43.

Logic function 54, for the embodiment shown, comprises a single field effect transistor 55. The transistor has an input 56 connected to its gate electrode. The logic function 54 has a resetting input 57. The resetting input 57 is mechanized with field effect transistor 58 having electrode 59 connected to ground. Electrode 60 is connected to the source electrode of transistor 55. The ground connection could be replaced by $\phi_1$ signal as previously indicated in connection with other embodiments. Input 57 may be connected directly to ground or may be connected to ground through transistor 58, in different embodiments.

The gate electrode of transistor 50, as well as the gate electrode of transistor 44, are connected to $\phi_1$ which has a true interval or level during a first recurring interval of time. The gate electrodes of transistor 45 and transistor 58 are connected to $\phi_2$ which has a true level at least during a second interval of time which is different from the first interval.

In operation, the device operates substantially the same as the embodiment shown in the previous figures. During a first interval of time, when $\phi_1$ is true, effective capacitor 53 is charged or set true. During a second interval of time, when $\phi_2$ is true, depending on the state of the input to transistor 55, the signal appearing at resetting input 57 is conditionally gated to the output to reset the output to zero. At other intervals, transistors 44 and 45 are cutoff and isolate the logic function from the output.

Figure 5:
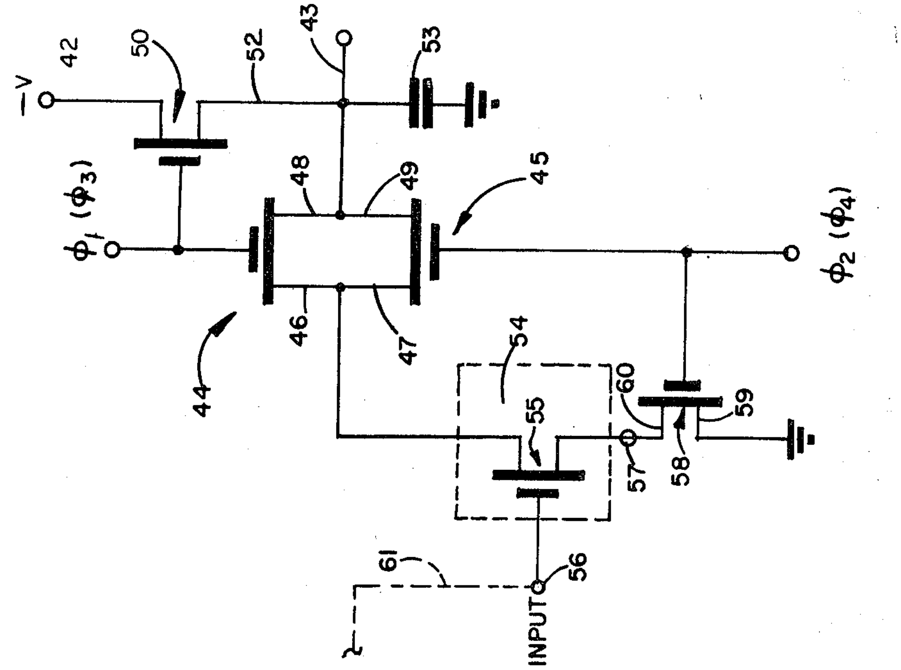
FIG. 5 is a representation of another embodiment of a two phase gating system.

Referring now to FIG. 5, wherein is shown substantially the same embodiment as described in connection with FIG. 4 except that transistors 44 and 45 are relocated with respect to output 43. In the FIG. 5 embodiment, source electrode 52 of transistor 50 is connected directly to the output as well as to electrodes 48 and 49 of transistors 44 and 45. Electrodes 46 and 47 are connected to logic function 54 as before. The circuit operates substantially the same as the FIG. 4 embodiment.

The output 43 of FIG. 4 may be connected to the input 36 of FIG. 5 via connector 61, shown dotted, to form a simple shift register stage if $\phi_3$ and $\phi_4$ of the FIG. 5 circuit are substituted for $\phi_1$ and $\phi_2$. Also in a preferred embodiment, the isolation transistor is connected at the same location in both circuits.

Figure 6:
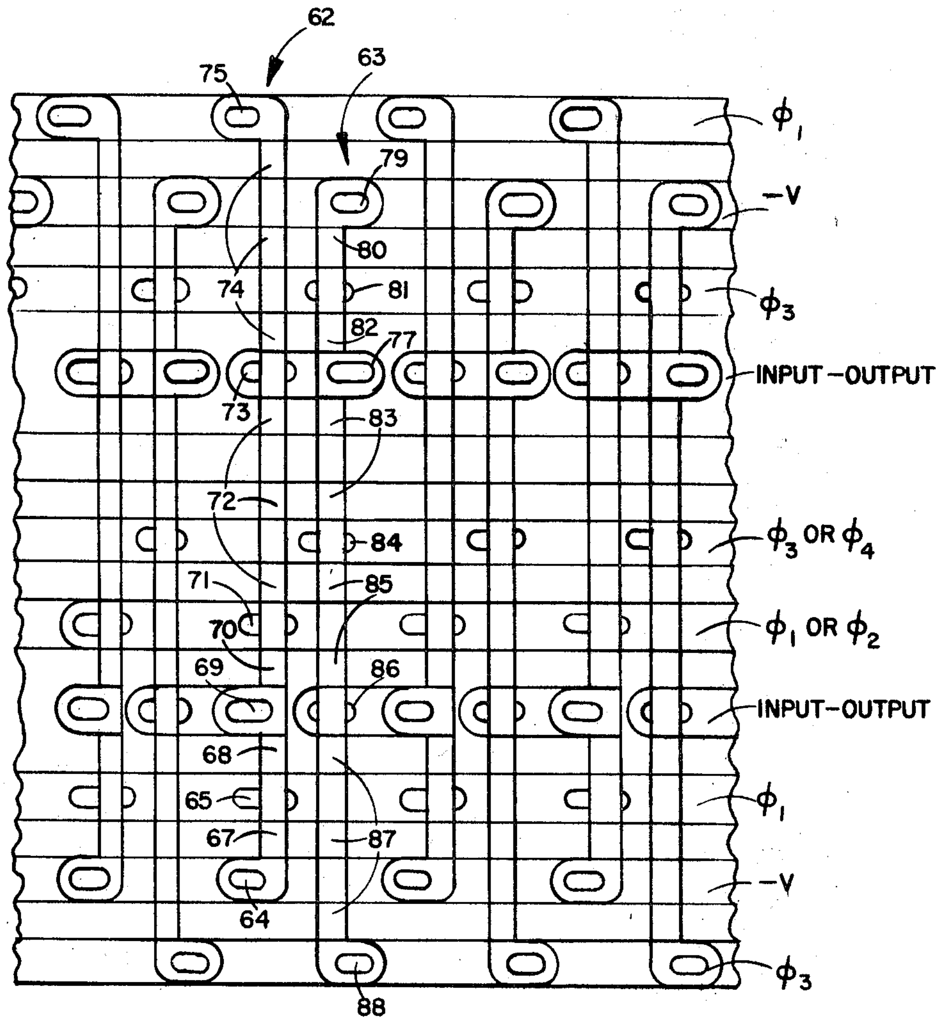
FIG. 6 is an actual embodiment of a portion of a simple shift register.

Referring now to FIG. 6, wherein is shown an actual representation of a portion of a multiple stage shift register formed on a silicon wafer. The representation shows eight half stages although for the purpose of this description, only two are utilized.

The schematic drawing of FIG. 2 is represented in FIG. 6 by gates 62 and 63 except that the gating signals for each are different.

Gate 62 is comprised of a terminal 64 which is connected to —V, a gate electrode 65 connected to $\phi_1$, drain 67 between the gate electrode and terminal 64 and source 68 between the output terminal 69 and gate 65.

The horizontally striped areas are metal conductors comprised of, for example, aluminum. Where the conductors have circular areas therein, as shown in connection with each gate and each terminal, the metal has been deposited either to the diffused silicon material or to an insulating oxide layer for forming the devices comprising the gates. The vertically striped areas are diffused with impurities to form either a P or N type material. For the particular embodiment shown and disclosed, P type material is used. The metal conductors are deposited at intervals so that by selectively forming gates and terminals, field effect devices are produced. In forming a terminal, the areas where it is desired to have a conductor contact the diffused material, the oxide is etched through from the outside. Subsequently the metal is deposited in the etched opening so that it contacts the surface. The areas in between the terminals and the gate electrodes are drains or sources for the field effect devices. The gate electrodes are deposited on their oxide layer formed on the surface of the wafer. The areas underneath the gate electrode is not diffused with an impurity.

Gate 65 which is connected to $\phi_1$ controls the conduction between the drain 67 and the source 68 to output terminal 69.

Gate 62 is further comprised of drain 70, gate electrode 71 which is connected to "$\phi_1$ or $\phi_2$" and source 72. It should be noted that drain 70 is simultaneously the source 68 of the first field effect device and that source 72 is also the drain of the field effect device comprised of gate electrode 73 and source 74.

The field effect transistors having gate 73 is the logic function for gate 62. Gate electrode 73 serves as the input to the gate. Source 74 is also connected to terminal 75 which is connected to a source for resetting the output as a function of the input on gate 73. For the embodiment shown, 75 is connected to $\phi_1$. When $\phi_2$ is true, $\phi_1$ is false and if the signals appearing at gate 73 is also true, the output capacitor is charged to ground.

Gates 63 includes the same components as gate 62 except that they are produced in reverse order. The only significance of the inverted arrangements of the gates is that it is easier to design and produce a system in that manner. Other embodiments are also possible.

Gate 63 comprises terminal 79 which is connected to —V, drain 80, gate electrode 81 which is connected to $\phi_3$, and source 82 which is connected to the output terminal 77.

The source gate drain combination comprises a field effect transistor. Drain 83 which is continuous with source 82, gate electrode 84 connected to "$\phi_3$ or $\phi_4$," and source 85 form a second transistor. The second transistor is described in connection with FIG. 2 as an isolation transistor.

Source 85 also comprises the drain for the transistor comprising the logic function for gate 63. The transistor also includes gate electrode 86 and source 87 which is connected to resetting terminal 88. The resetting terminal is connected to $\phi_3$.

The shift register operates substantially the same as previously described in connection with FIG. 2. Whenever $\phi_1$ is true, the output effective capacitance and the capacitance of the logic function (not shown) are charged toward the level of —V. Whenever $\phi_2$ is true, and if the signal appearing at gate electrode 73 is also true, the output capacitance is charged to the level of $\phi_1$, which is false. In the event the signal appearing at gate electrode 73 is false, the output capacitor (not shown) at output 69 remains true.

Whenever $\phi_1$ is true, the output capacitor is recharged toward —V. Output 69 is connected as input 86 of gate 63 which is similar to input 73 of gate 62. Whenever $\phi_3$ is true, —V charges the effective capacitor (not shown) of output 77 toward —V. Subsequently, when $\phi_4$ is true, and if the signal appearing on the gate electrode 86 is true, the output capacitor is charged to ground. Output 77 is used as an input to a subsequent stage similar to input 86. The input to gate 62 is also the output from a previous stage. Therefore, it can be seen that if the output of a previous stage is true during the times that $\phi_1$ and $\phi_2$ are true, it will cause the transistor comprised of source 74, gate 73 and drain 72 to conduct and reset the output capacitor associated with output 69 to ground. All of the gates shown in FIG. 6 are similarly interconnected to each other.

While the principles of the invention have now been made clear in an illustrative embodiment there will be immediately obvious to those skilled in the art many modifications in structure, arrangement, the elements and components used in the practice of the invention, and otherwise, which are particularly adapted for specific environments and operating requirements without departing from those principles. The appended claims are therefore intended to cover and embrace any such modification within the limits only of the true spirit and scope of the invention.

What is claimed is:

1. A multiphase logical gating circuit having an output comprising, a two terminal logical network comprising one or more field effect transistors having one or more control electrodes, the signals on said control electrodes determining the existence of an electrical path from one terminal to the other, field effect transistor means and isolation field effect transistor means operable to conduct electrical current therethrough to one terminal of said logical network and to said output for simultaneously applying a voltage level to said one terminal of said logical network and to said output during a first phase recurring clock signal, said field effect transistor means operable to conduct electrical current therethrough only during said first phase recurring clock signal, means for applying a different voltage level to the other terminal of said logical network at least durmg a second phase recurring clock signal, and said isolation field effect transistor means operable to conduct electrical current therethrough during said second phase recurring clock signal for connecting said one terminal to said output during said second phase recurring clock signal.

2. The combination recited in claim 1 wherein said output includes capacitance which comprises at least a portion of the inherent capacitance of the field effect transistor means and the isolation field effect transistor means.

3. The combination recited in claim 1 wherein said output includes at least a portion of the inherent capacitance of the isolation field effect transistor means.

4. The combination recited in claim 1 wherein said other terminal has a voltage potential substantially equal to the first recited voltage potential during said first phase recurring clock signal.

5. The combination recited in claim 1 wherein said other terminal is connected to electrical ground, and wherein a second isolation field effect transistor is connected between said other terminal and said electrical ground for isolating said terminal from ground during said first phase recurring clock signal to prevent connecting said first recited voltage level to electrical ground during said first phase recurring clock signal.

6. The combination recited in claim 1 wherein said logical gating circuit further comprises isolation field effect transistor means connected between said output and a common point between said field effect transistor means and said one terminal of the two terminal logical network.

7. The combination recited in claim 1 wherein said isolation field effect transistor means comprises second and third field effect transistor devices connected in electrical parallel between said output and a common point between said field effect transistor means and said one terminal of the two terminal network, said second device being operable only during said first phase recurring close signal, said third device being operable only during said second phase recurring clock signal.

8. The combination recited in claim 7 including a second isolation field effect transistor means connected bebetween said other terminal and electrical ground, said second field effect transistor means being operable during said second phase recurring clock signal.

9. The combination recited in claim 1 wherein said field effect transistor means has one electrode connected to said output, and said isolation field effect transistor means comprises second and third field effect transistor devices connected in electrical parallel between said electrode and said one terminal of the two terminal logic network, one of said devices being operable during said first phase recurring clock signal and the other of said devices being operable during said second phase recurring clock signal, and a second isolation field effect transistor means connected between said other terminal and electrical ground, said second isolation field effect transistor means being operable during said second phase recurring clock signal.

10. The combination recited in claim 1 wherein said output includes capacitance and said output being connected to a common point between said field effect transistor means and said isolation field effect transistor means.

11. The combination recited in claim 10 wherein said multiphase logical gating circuit further includes a second output and, a second two terminal logical network comprising one or more field effect transistors, having one or more control electrodes, the signals on said control electrodes determining the existence of an electrical path from one terminal to the other, a second field effect transistor means and second isolation field effect transistor means operable for simultaneously applying a voltage level to one terminal of said second logical network and to said second output during a third phase recurring clock signal, said second field effect transistor means operable only during said third phase recurring clock signal, second means for applying a different voltage level to the other terminal of said second logical network at least during a fourth phase recurring clock signal and said second isolation field effect transistor means operable for connecting said one terminal to said second output during said fourth phase recurring clock signal, said first recited output of the multiphase logical gating circuit comprising an input to a control electrode of said second two terminal logical network for forming one stage of a shift register.

12. A multiple phase logical gating circuit comprising, a logical network having first and second terminals comprising one or more field effect transistors having one or more control electrodes, the signals on the control electrodes determining the existence of an electrical path from one terminal to the other, means including field effect transistor means for applying substantially the same voltage level to said first and second terminals of said logical network during a first phase recurring clock signal, means for changing the voltage level on said first terminal of said logical network during a second phase recurring clock signal, and means conducting electrical current therethrough during said first and second phase recurring clock signals for connecting said second terminal to an output during said first and second phase recurring clock signals.

13. The combination recited in claim 12 wherein said means for changing comprises said first phase recurring clock signal.

14. The combination recited in claim 12 wherein said means for connecting comprises an isolation field effect transistor means connected between said second terminal and said output.

15. Logic gating means comprising an output, and a logical network having first and second terminals comprising one or more field effect transistors having one or more control electrodes, the signals on the control electrodes determining the impedance of an electrical path from one terminal to the other, means including field effect transistor means and isolation field effect transistor means operable to conduct electrical current therethrough for simultaneously applying substantially the same voltage level to said first and second terminals of the logical network and the output during a first phase recurring clock signal, means for changing the voltage level on said first terminal of the logical network during a second phase recurring clock signal, and said isolation field effect transistor means operable to conduct electrical current therethrough during said second phase recurring clock signal for connecting said second terminal to said output during said second phase recurring clock signal.

16. A multiphase gate comprising, an output, a field effect transistor having one electrode connected to said output, a second electrode connected to a first voltage level, and a control electrode for rendering said field effect transistor operable to conduct electrical current therethrough during a first phase recurring clock signal for connecting said first voltage level to said output, a logical network having first and second terminals and comprising one or more field effect transistors having one or more control electrodes for receiving input signals, said input signals determining the impedance of an electrical path from one terminal of said network to the other, an isolation field effect transistor having one electrode connected to said first terminal of said logical network, a second electrode connected to the one electrode of said first field effect transistor and to said output, and a control electrode for rendering said isolation field effect transistor operable to conduct electrical current therethrough during said first phase recurring clock signal for applying said voltage level to a first terminal of the logical network and during a second phase recurring clock signal for connecting said output to said first terminal, said second terminal of said logical network being connected to a voltage level which is different from the first voltage level at least during said second phase recurring clock signal whereby if the impedance between said terminals is relatively low, said voltage level on said output is changed to the different voltage level.

17. A multiphase gate comprising, an output.

a field effect transistor having a first electrode, a second electrode connected to a first voltage level, and a control electrode for rendering said field effect transistor operable to conduct electrical current therethrough during a first phase recurring clock signal, a logical network having first and second terminals and comprising one or more field effect transistors having one or more control electrodes for receiving input signals, said input signals determining the impedance of an electrical path from one terminal of said logical network to the other terminal, an isolation field effect transistor having one electrode connected to said output, a second electrode connected to the first electrode of the first field effect transistor and to the first terminal of said logical network, and a control electrode for rendering said isolation field effect transistor operable to conduct electrical current therethrough during said first and during a second phase recurring clock signal which, in conjunction with said first recited field effect transistor, connects said first voltage level to said output during said first phase recurring clock signal and connects the output to the first terminal of said logic network during said second phase recurring clock signal, said second terminal of said logical network being connected to a voltage level which is different from the first voltage level at least during said second phase recurring clock signal whereby if the impedance between said terminals is relatively low, said voltage level on said output is changed to the different voltage level.

18. The multiphase logical gating circuit recited in claim 1 wherein said isolation field effect transistor means is rendered non-conducting after said second phase recurring clock signal for isolating said output from said one terminal until said first phase recurring clock signal.

19. The multiphase logical gating circuit as recited in claim 1 wherein said field effect transistor means comprises a gate electrode connected to said first phase recurring clock signal and another electrode connected to said first phase recurring clock signal for providing said voltage level to said one terminal of said logical network and to said output during said first phase recurring clock signal.

20. The multiphase logical gating circuit recited in claim 12 wherein said means conducting electrical current therethrough during said first and second phase recurring clock signals comprises a second field effect transistor connected in series circuit with said logical network and said output.

References Cited

UNITED STATES PATENTS

| | | | |
|---|---|---|---|
| 2,873,363 | 2/1959 | Wanlass. | |
| -2,873,385 | 2/1959 | Ostendorf. | |
| 3,082,332 | 3/1963 | Smeltzer et al. | |
| 3,119,031 | 1/1964 | Smeltzer et al. | |
| 3,121,177 | 2/1964 | Davis. | |
| 3,151,251 | 9/1964 | Lee. | |
| 3,168,649 | 2/1965 | Meyers. | |
| 3,215,859 | 11/1965 | Sorchych. | |
| 3,289,010 | 11/1966 | Bacon et al. | |
| 3,292,091 | 12/1966 | Kosanke et al. | |
| 3,343,130 | 9/1967 | Petschauer et al. | |
| 3,393,325 | 7/1968 | Borrer et al. | |
| 3,171,984 | 3/1965 | Eshelman et al. | 307—246 X |
| 3,292,008 | 12/1966 | Rapp | 307—251 X |
| 3,267,295 | 8/1966 | Zuk | 307—279 X |
| 3,292,008 | 12/1966 | Rapp | 307—247 |
| 3,356,858 | 12/1967 | Wanlass | 307—205 |
| 3,363,115 | 1/1968 | Stephenson et al. | 307—279 |
| 3,393,325 | 7/1968 | Borror et al. | 307—205 |
| 3,395,291 | 7/1968 | Bogert | 307—205 |
| 3,395,292 | 7/1968 | Bogert | 307—221 |
| 3,421,092 | 1/1969 | Bower et al. | 328—37 |
| 3,431,433 | 3/1969 | Ball et al. | 307—221 |
| 3,454,785 | 7/1969 | Norman et al. | 307—251 |
| 3,461,312 | 8/1969 | Farber et al. | 307—221 |

OTHER REFERENCES

Gillet: Low Impedance Switch Circuit, I.B.M. Technical Disclosure Bulletin, vol. 7, No. 6, 11-64 (p. 440).

Ruoff: Field Effect Transistor Clocked Logic, I.B.M. Technical Disclosure Bulletin, vol. 8, No. 4, 9-65 (pp. 640, 641).

JOHN S. HEYMAN, Primary Examiner

U.S. Cl. X.R.

307—251, 208, 213, 279